United States Patent
Valdes Garcia et al.

(10) Patent No.: US 11,764,468 B2
(45) Date of Patent: Sep. 19, 2023

(54) PHASED ARRAY SYSTEM-IN PACKAGE SUPPORTING SPATIO-SPECTRAL DIVISION MULTIPLEXING

(71) Applicants: INTERNATIONAL BUSINESS MACHINES CORPORATION, Armonk, NY (US); FUJIKURA LTD, Tokyo (JP)

(72) Inventors: Alberto Valdes Garcia, Chappaqua, NY (US); Arun Paidimarri, White Plains, NY (US); Bodhisatwa Sadhu, Peekskill, NY (US); Jean-Olivier Plouchart, New York, NY (US); Xiaoxiong Gu, Scarsdale, NY (US); Christian Wilhelmus Baks, Pleasant Valley, NY (US); Yo Yamaguchi, Chiba (JP); Kiyoshi Kobayashi, Chiba (JP); Yoshiharu Fujisaku, Chiba (JP); Ning Guan, Chiba (JP)

(73) Assignees: INTERNATIONAL BUSINESS MACHINES CORPORATION, Armonk, NY (US); FUJIKURA LTD, Chiba (JP)

( * ) Notice: Subject to any disclaimer, the term of this patent is extended or adjusted under 35 U.S.C. 154(b) by 9 days.

(21) Appl. No.: 17/468,586

(22) Filed: Sep. 7, 2021

(65) Prior Publication Data
US 2023/0074376 A1    Mar. 9, 2023

(51) Int. Cl.
*H04B 7/06* (2006.01)
*H01Q 3/26* (2006.01)

(52) U.S. Cl.
CPC ......... *H01Q 3/2617* (2013.01); *H04B 7/0617* (2013.01)

(58) Field of Classification Search
CPC ...... H01Q 3/2617; H04B 7/06; H04B 7/0615; H04B 7/0617
See application file for complete search history.

(56) References Cited

U.S. PATENT DOCUMENTS 9,332,519 B2    5/2016    Kludt
9,461,727 B2    10/2016   Xue
(Continued)

FOREIGN PATENT DOCUMENTS

WO    2018-081162 A1    5/2018

OTHER PUBLICATIONS

Torres-Rosario, J., "Implementation of a Phased Array Antenna Using Digital Beamforming"; University of Puerto Rico (2005); 233 pgs.

(Continued)

*Primary Examiner* — Siu M Lee
(74) *Attorney, Agent, or Firm* — Intelletek Law Group, PLLC; Gabriel Daniel, Esq.

(57) ABSTRACT

A phased array antenna includes an antenna array substrate having a plurality of antenna elements. At least two beamformers are coupled to the plurality of antenna elements. At least two filters support different frequency bands and are respectively coupled to the at least two beamformers. A frequency converter is coupled to the at least two filters, the frequency converter including one intermediate frequency (IF) port and at least two radio frequency (RF) ports. The one IF port of the frequency converter is configured to support the at least two beamformers via the at least two RF ports. A first beamformer of the at least two beamformers is coupled to a first filter of the at least two filters to form a first beam in a direction different than a second beamformer of the first two beamformers coupled to a second filter of the at least two filters.

12 Claims, 10 Drawing Sheets

(56) References Cited

U.S. PATENT DOCUMENTS

| | | |
|---|---|---|
| 9,485,770 B2 | 11/2016 | Banu et al. |
| 10,972,172 B2 | 4/2021 | Krunz et al. |
| 11,570,759 B2* | 1/2023 | Akkarakaran ........ H04L 5/0048 |
| 2007/0285312 A1 | 12/2007 | Gao et al. |
| 2021/0067182 A1 | 3/2021 | Ravi et al. |
| 2021/0119662 A1* | 4/2021 | Lee ...................... H04B 1/0071 |
| 2021/0266052 A1* | 8/2021 | Fernando ............... H04B 1/401 |
| 2021/0288632 A1* | 9/2021 | Khlat ..................... H03H 11/16 |
| 2022/0038235 A1* | 2/2022 | Raghavan ............. H04L 5/0051 |
| 2022/0141862 A1* | 5/2022 | Bai ....................... H04L 1/1812 |
| | | 370/329 |

OTHER PUBLICATIONS

Kalia, S. et al., "Multi-Beam Spatio-Spectral Beamforming Receiver for Wideband Phased Arrays"; IEEE Transactions on Circuits and Systems (2013); vol. 60:8, 12 pgs.

\* cited by examiner

PHASED ARRAY SYSTEM-IN PACKAGE SUPPORTING SPATIO-SPECTRAL DIVISION MULTIPLEXING

BACKGROUND

Technical Field

The present disclosure generally relates to antenna arrays, and more particularly, to phased array antennas using a system-in-package construction.

Description of the Related Art

Signal propagation in 4G and earlier cellular communication systems was in an omnidirectional form and structures such as walls, ceilings, etc., were not significant blockers. More recent cellular communication systems, such as 5G, utilize millimeter-wave frequencies and beamforming to direct energy to a user in a specific location in the form of a beam. For a given cell with antennas in a center area, beams are sent directly to a user. Spatio-spectral resource sharing has been developed to create or avoid interference between users with two variables using space and frequency. Antenna arrays are used for beamforming by constructing antenna elements such that some signals constructively interfere with each other at some angles and destructively interfere with each other at other angles.

SUMMARY

In one embodiment, a phased array antenna includes an antenna array substrate having a plurality of antenna elements. At least two beamformers are coupled to the plurality of antenna elements. At least two filters supporting different frequency bands and are respectively coupled to the at least two beamformers. A frequency converter is coupled to the at least two filters, the frequency converter including one intermediate frequency (IF) port and at least two radio frequency (RF) ports. The one IF port of the frequency converter is configured to support the at least two beamformers via the at least two RF ports. A first beamformer of the at least two beamformers is coupled to a first filter of the at least two filters to form a first beam in a direction different than a second beamformer of the first two beamformers coupled to a second filter of the at least two filters.

In an embodiment, each filter of the at least two filters is selectable to output a specific frequency band to one of the at least two beamformers.

In an embodiment, the at least two beamformers, the at least two filters, and the frequency converter are configured to support two different antenna polarizations.

In an embodiment, the at least two beamformers are configured to create different beams in different directions at the same or different polarizations and different carrier frequencies with different data to support multiple users.

In an embodiment, the phased array antenna includes at least two power splitters, wherein each power splitter is coupled to one of the at least two filters and to two of the at least two beamformers.

In an embodiment, the at least two power splitters and the at least two filters are bidirectional and dynamically tuned.

In an embodiment, the IF port of the frequency converter is configured to input/output an IF signal from/to a same digital baseband module including a digital to analog converter (DAC) and an analog to digital converter (ADC).

In an embodiment, a dual-polarization arrangement includes an antenna array substrate having a plurality of dual-polarized antenna array elements. For each antenna polarization, the embodiment includes at least two filters and at least two beamformers coupled to the corresponding antenna polarization ports. A frequency converter is coupled to the at least two filters for each antenna polarization.

In an embodiment, the frequency converter includes a second IF port; and each IF port is configured to support two RF ports of a respective antenna array polarization.

In one embodiment, the antenna array is configured for dual-polarization transmission and for dual-polarization reception.

In an embodiment, the dual-polarized antenna array is formed as a pluggable module enabling the realization of a multi-tile phased array.

In an embodiment, a phased array antenna network uses spatio-spectral division multiplexing. The network includes one or more base stations, and a base station controller configured to determine when a user equipment (UE) demand exceeds a service capacity of the one or more base stations. The base station controller adds one or more base stations to the phased antenna array network to increase the service capacity of UE in a unit area. The base station controller is configured to add spatio-spectral division multiplexing in which multiple antennas in an antenna array of one of the base stations operates at a same frequency channel in a different beam in an adjacent cell to increase a capacity of the one or more base stations. The phased array antenna network operates different beams at different frequencies of a same cell with different data.

In an embodiment, the base station controller is configured to add a spatio-spectral division to increase a base station capacity by a factor of n, where n is a number of spectral filters, and n<=min(n-sfltr, n-adc/dac), where n-sfltr is the maximum number of spectral filters that can be used by the base station to cover the area, n-adc/dac is the maximum number of spectral channels supported by an analog-to-digital converter, and digital-to-analog converter.

In an embodiment, each phased array antenna in the one or more base stations includes at least two beamformers coupled to the plurality of antenna elements, and at least two filters having different frequency bands and respectively coupled to the at least two beamformers. A frequency converter is coupled to the at least two filters, and the frequency converter includes one intermediate frequency (IF) port and at least two radio frequency (RF) ports. The one IF port of the frequency converter is configured to support the at least two beamformers via the at least two RF ports. A first beamformer of the at least two beamformers is coupled to a first filter of the at least two filters to form a first beam in a direction different than a second beamformer of the first two beamformers coupled to a second filter of the at least two filters.

In an embodiment, a method of providing a scaled phased array antenna system, includes providing at least one multi-tile phased array antenna package mounted on a printed circuit board (PCB) single substrate. The scaled phased array antenna system is configured so that different beams are created in different directions at the same or different polarizations and different carrier frequencies with different data to support multiple users.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition to or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Overview

In the following detailed description, numerous specific details are set forth by way of examples to provide a thorough understanding of the relevant teachings. However, it should be understood that the present teachings may be practiced without such details. In other instances, well-known methods, procedures, components, and/or circuitry have been described at a relatively high level, without detail, to avoid unnecessarily obscuring aspects of the present teachings.

As discussed herein, one or more illustrative embodiments of a phased array antenna leverage spatio-spectral division multiplexing by pointing different beams with different data and different frequencies using a same array antenna. Through the use of specific techniques discussed herein, the use of spatio-spectral resource allocation provides an increase in network throughput, and the same frequency channel can be reused in a different beam in an adjacent cell.

Figure 1A:
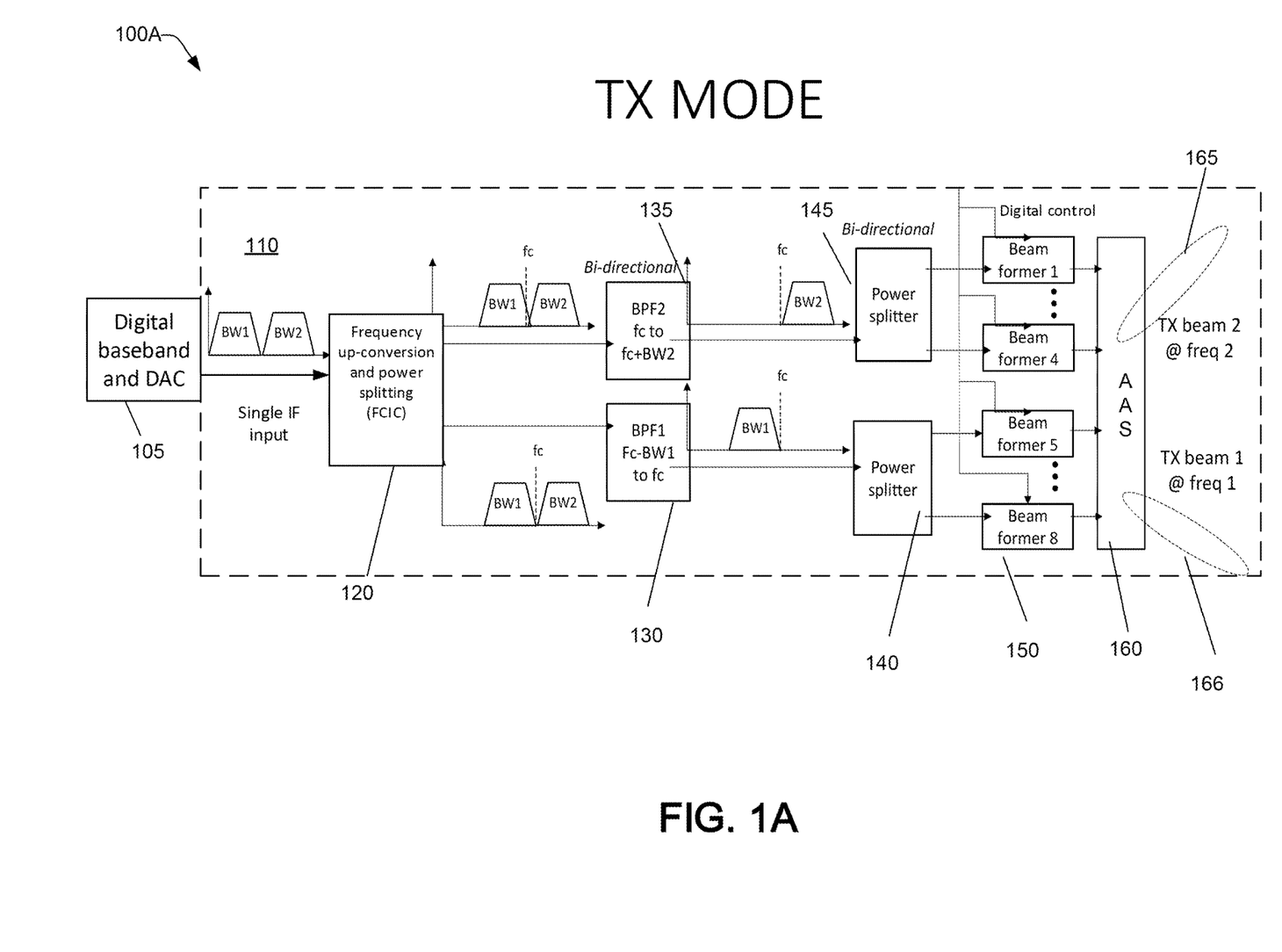
FIG. 1A is a functional diagram of a physical implementation of a phased array antenna in a transmission (TX) mode, consistent with an illustrative embodiment.

FIG. 1A is a functional diagram of a physical implementation of a phased array antenna 110 in a transmission (TX) mode, consistent with an illustrative embodiment. It is to be understood that the present disclosure is not limited to the depictions in the drawings, as there may be fewer elements or more elements than shown and described. In this illustrative embodiment of FIG. 1A, there is shown a transceiver which can be operated in transmit mode and receive mode, but it is to be understood that a transmit-only circuit or a receive-only circuit can be provide instead of a transceiver.

A digital baseband and digital-to-analog converter (DAC) 105 outputs a single IF output that is processed and results in a final output of two beams 165, 166 transmitted by antenna elements of the antenna array substrate (AAS) 160. The single IF output and two content modulated signals (BW1, BW2) are input to a frequency up-conversion and power splitting integrated circuit (FCIC) module 120. Although a single FCIC 120 is shown in FIG. 1A, it is to be understood that there can be two FCIC modules arranged as a single module.

The filters BPF1 130 and BPF2 support different frequency bands and are coupled to respective beamformers. Filter BPF1 130 selectively passes BW1 to power splitter 140, and BPF2 135 selectively passes BW2 to power splitter 145. The power splitters 140, 145 each output signals to one or more beamformers 150. The beamformers 150 output signals to different antenna ports of the antenna array substrate 160, and beams TX beam 1 and TX beam 2 propagate different data at different frequencies.

Figure 1B:
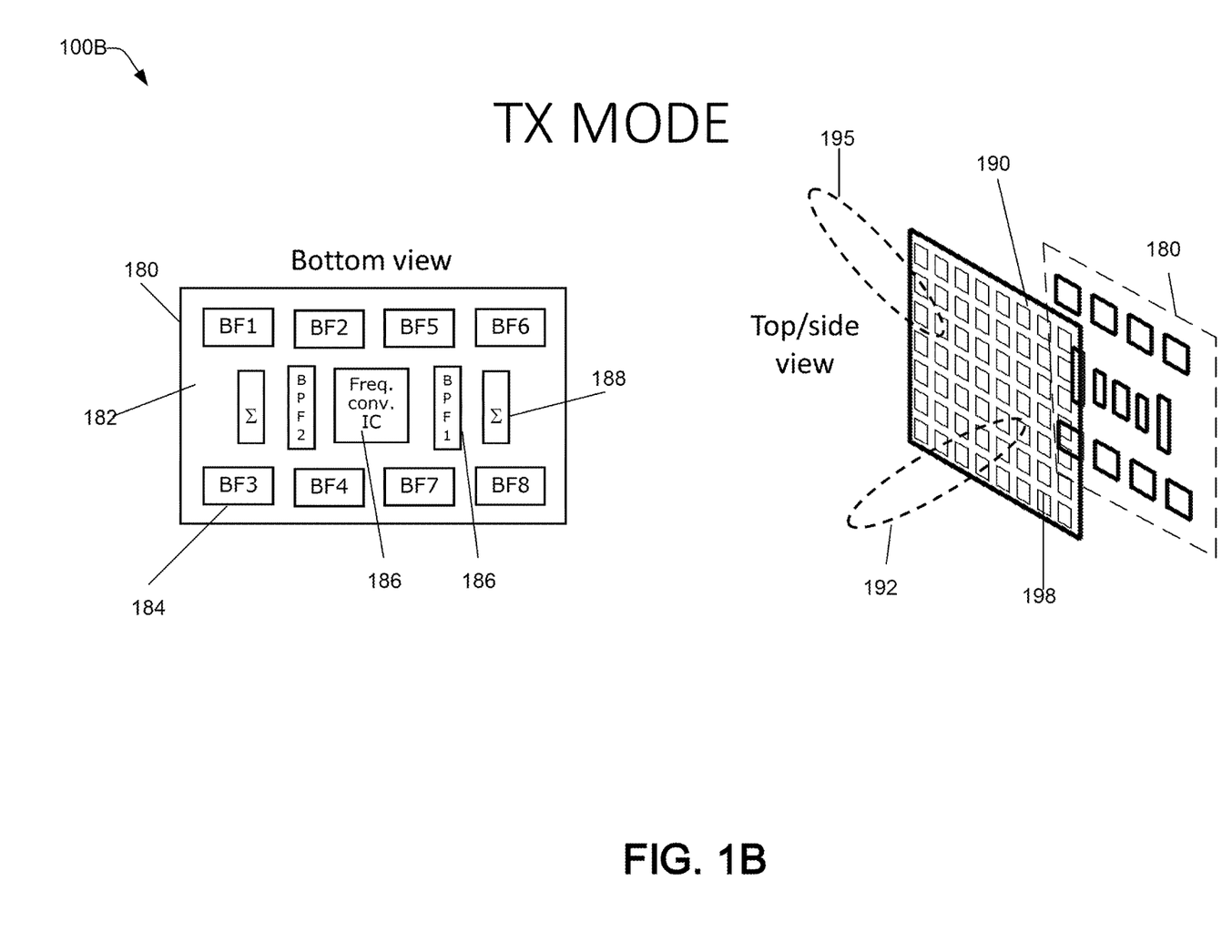
FIG. 1B is an illustration of a physical implementation of the phased array antenna of FIG. 1A, consistent with an illustrative embodiment.

FIG. 1B is an illustration 109 of a physical implementation of the phased array antenna of FIG. 1A, consistent with an illustrative embodiment. The implementation of the phased array antenna in a TX mode is shown in a bottom view 180 and a perspective view 190. It is to be understood that the appended claims are not limited to the arrangement shown in FIG. 1B.

The bottom view 180 shows the components of FIG. 1A as arranged on a substrate 182. For example, the substrate 182 includes the beamformers 184, the FCIC 185, bandpass filters 186, and the antennas 188. The perspective view 190 shows beams 192, 195 and antenna elements 198. By virtue of the teachings herein, the present disclosure provides a method to enable spatio-spectral division multiplexing without increasing an I/O count, an ADC/DAC count, and a minimal area/power penalty Additional advantages of the present architecture are disclosed herein.

EXAMPLE EMBODIMENTS

Figure 2A:
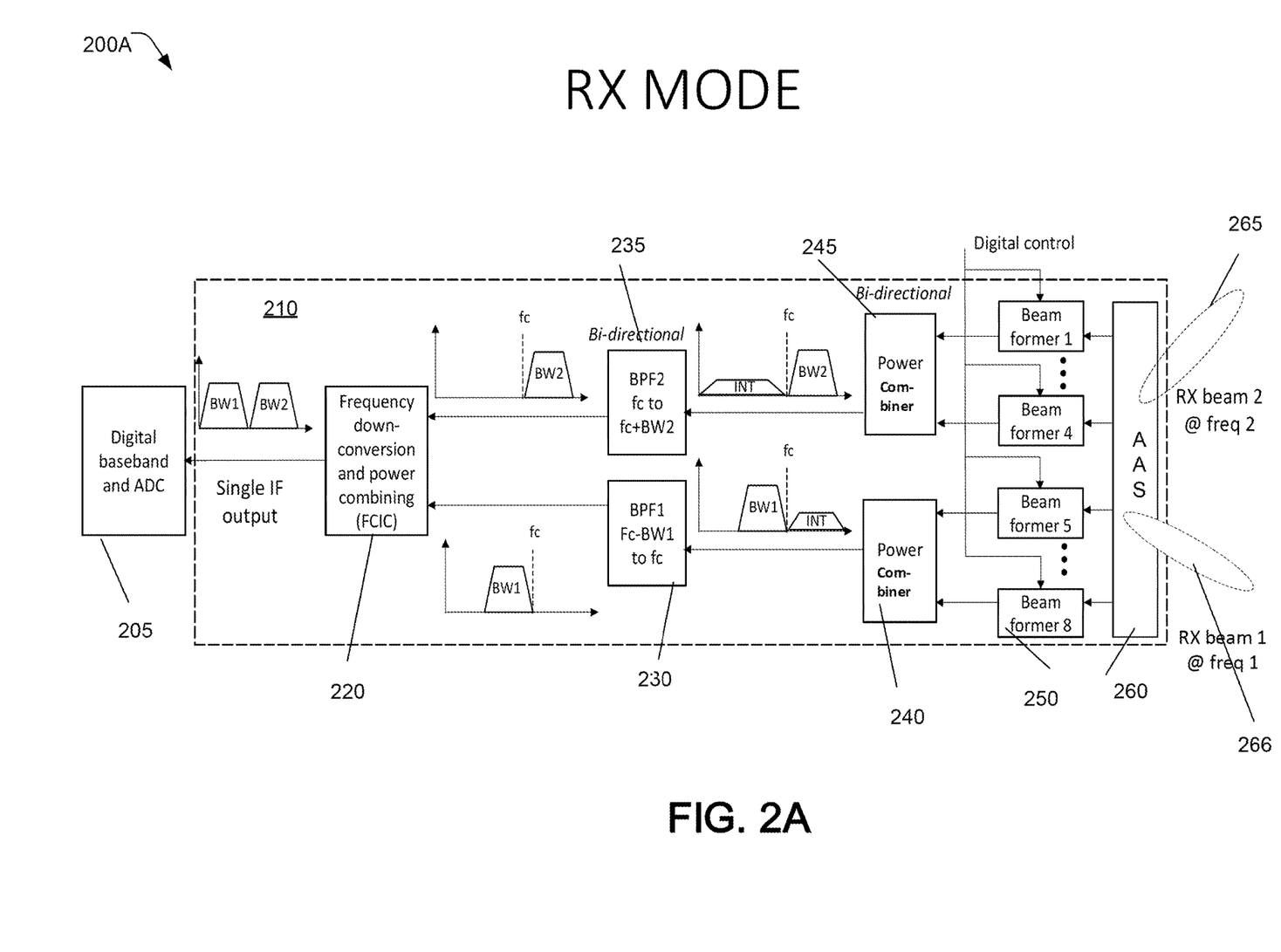
FIG. 2A is a functional diagram of a physical implementation of a phased array antenna in a receive mode (RX) mode, consistent with an illustrative embodiment.

FIG. 2A is a functional diagram 200A of a physical implementation of a phased array antenna 210 in a receive mode (RX) mode, consistent with an illustrative embodiment. In this illustrative embodiment, the RX beams 265, 266 are form in different directions with respect to an antenna substrate array (AAS) 260. The beamformers 250 are coupled to the AAS 260 and to one of the power combiners 240, 245. Each of the power combiners are coupled to a band pass filter, (BPF1 235, BPF2 230). The signals are then processed by a frequency down conversion and power combining (FCIC) module 225A single IF output is then provided to an ADC and a digital baseband.

Figure 2B:
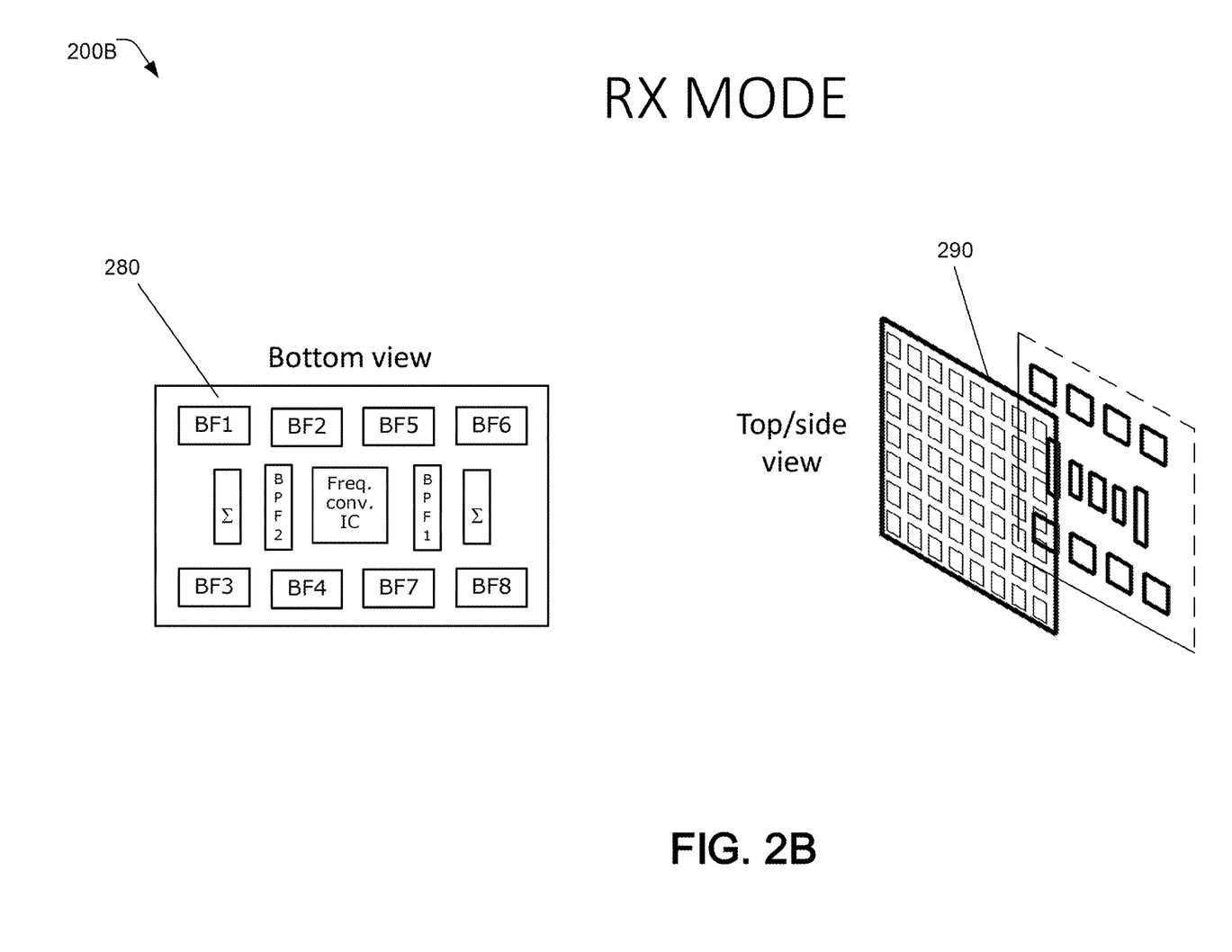
FIG. 2B is an illustration of a physical implementation of the phased array antenna of FIGS. 2A and 1A, consistent with an illustrative embodiment.

FIG. 2B is an illustration 200B of a physical implementation of the phased array antenna of FIG. 2A, consistent with an illustrative embodiment. The bottom view 280 and the top view 290 have similar components as shown and discussed in FIG. 1B except that the operation is in a receive mode.

Figure 3:
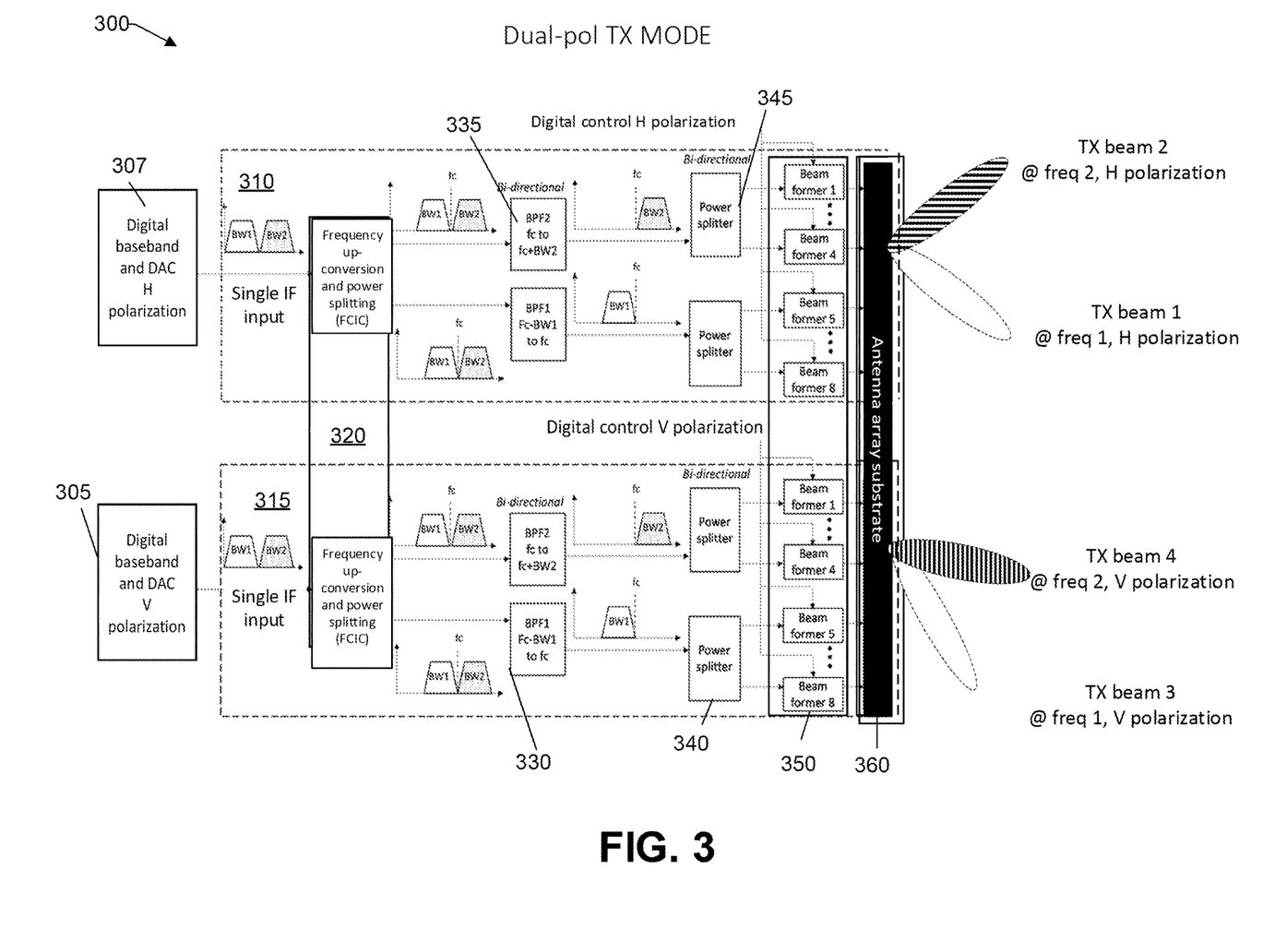
FIG. 3 illustrates a dual-polarization phased array antenna in a TX mode, consistent with an illustrative embodiment.

FIG. 3 is an illustration 300 of a dual-polarization phased array antenna in a TX mode, consistent with an illustrative embodiment. An H-pol 310 and a V-pol 315 are shown in FIG. 3. The dual-pol TX mode is different than the single pole shown in FIG. 1A because there are two groups of digital basebands and DACs 305, 307 with a respective V polarization and H polarization. There is a single FCIC 320 that performs the frequency conversion and power combining for each of the H-pol 310 and V-pole portion 315.

There are two pairs of bandpass filters 330,335 (one pair for the V-pol and one pair for the H-pol, two pairs of power splitters 340, 345, a group of beamformers 350 for each pol, and an antenna array substrate 360 in which each antenna supports two polarizations has two corresponding input ports. Tx beams 1 and 2 have different orientations, as well as two different frequencies and H-polarization. Tx beams 3 and 4 have different orientations as well as different frequencies and V-polarization.

Figure 4:
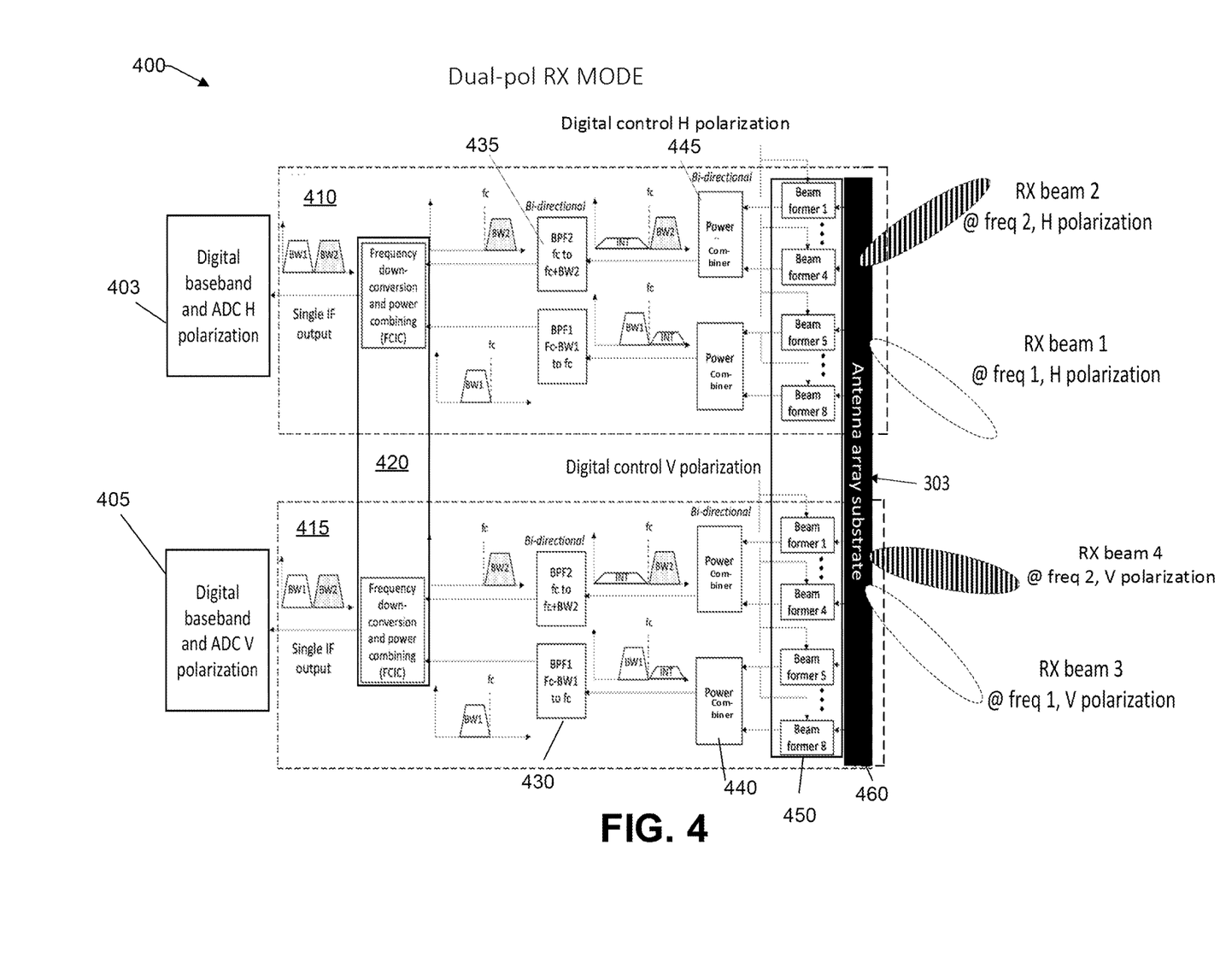
FIG. 4 illustrates a dual-polarization phased array antenna in an RX mode, consistent with an illustrative embodiment.

FIG. 4 illustrates a dual-pol phased array antenna 400 in an RX mode, consistent with an illustrative embodiment. FIG. 4 is similar to FIG. 3 except that the operation is in RX mode rather than TX mode. FIG. 4 includes an H-pol array 410 and a V-pol array 415. The dual-pol RX includes a digital baseband and ADC H-polarization 403, and a digital baseband and ADC V-polarization 405. Two receive beams in different directions and frequencies are formed for each of the two antenna polarizations supported by the dual polarization antenna array substrate 460. Each of two groups of beamformers 450 are respectively coupled to one of the two antenna array substrates 460. Each group of beamformers 450 is coupled to one pair of power combiners 440, 445. Each of two pairs of power combiners 440, 445 are respectfully coupled to one of the pairs of bandpass filters 430, 435. Each portion of an FCIC 420 is coupled to one pair of the bandpass filters 430, 435. The FCIC 420 provides a single IF output to each of the respective digital baseband modules 403, 405. It is to be understood that the present disclosure is not limited to the arrangements shown and described herein. For example, the beamformer circuits supporting both antenna polarizations are integrated monolithically, and these dual-polarization beamformer ICs are coupled to the antenna array substrate. In another example, the frequency conversion circuits supporting both antenna polarizations are integrated monolithically and this frequency conversion IC is coupled to the antenna array substrate. In addition, there is a case where at least two frequency converter ICs are used (e.g., a 2 IF to 2RF one frequency converter), each with one IF to one RF conversion, and share an IF signal to effectively create 1IF to 2RF conversions. Such a component may be referred to as a 2 IF to 2RF one frequency converter.

Figure 5:
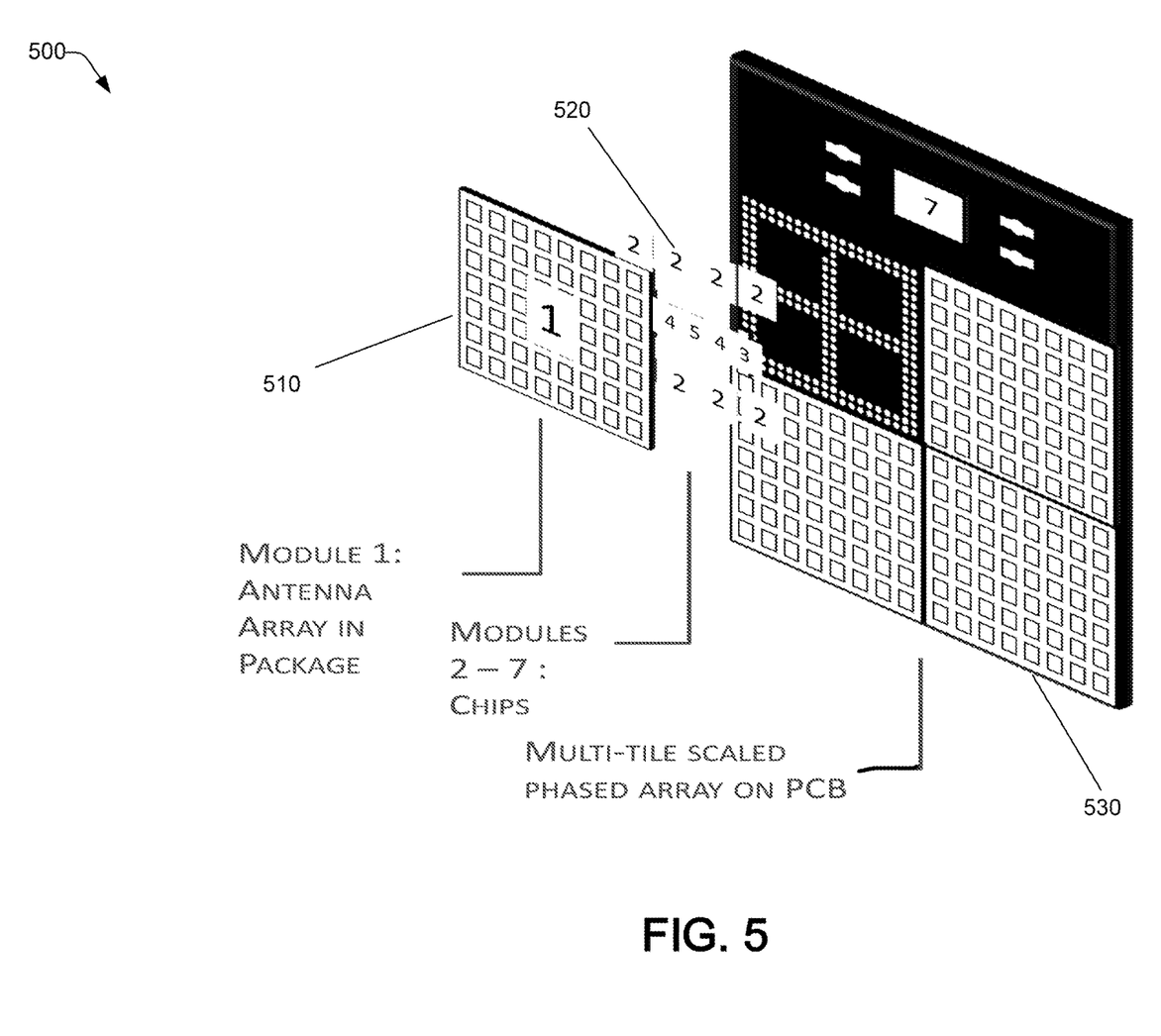
FIG. 5 illustrates a scaled array using single-substrate implementations, consistent with an illustrative embodiment.

FIG. 5 illustrates a scaled array using single-substrate implementations, consistent with an illustrative embodiment. In one aspect of the present disclosure, the array antenna system can be constructed for scalar expansion. For example, a PC Board 530 has an area in which an antenna array-in-package 510 is arranged as needed. In each module 510, there is a plurality of module chips. As shown in FIG. 5, the modules can be tiled on the PC Board 530.

Figure 6:
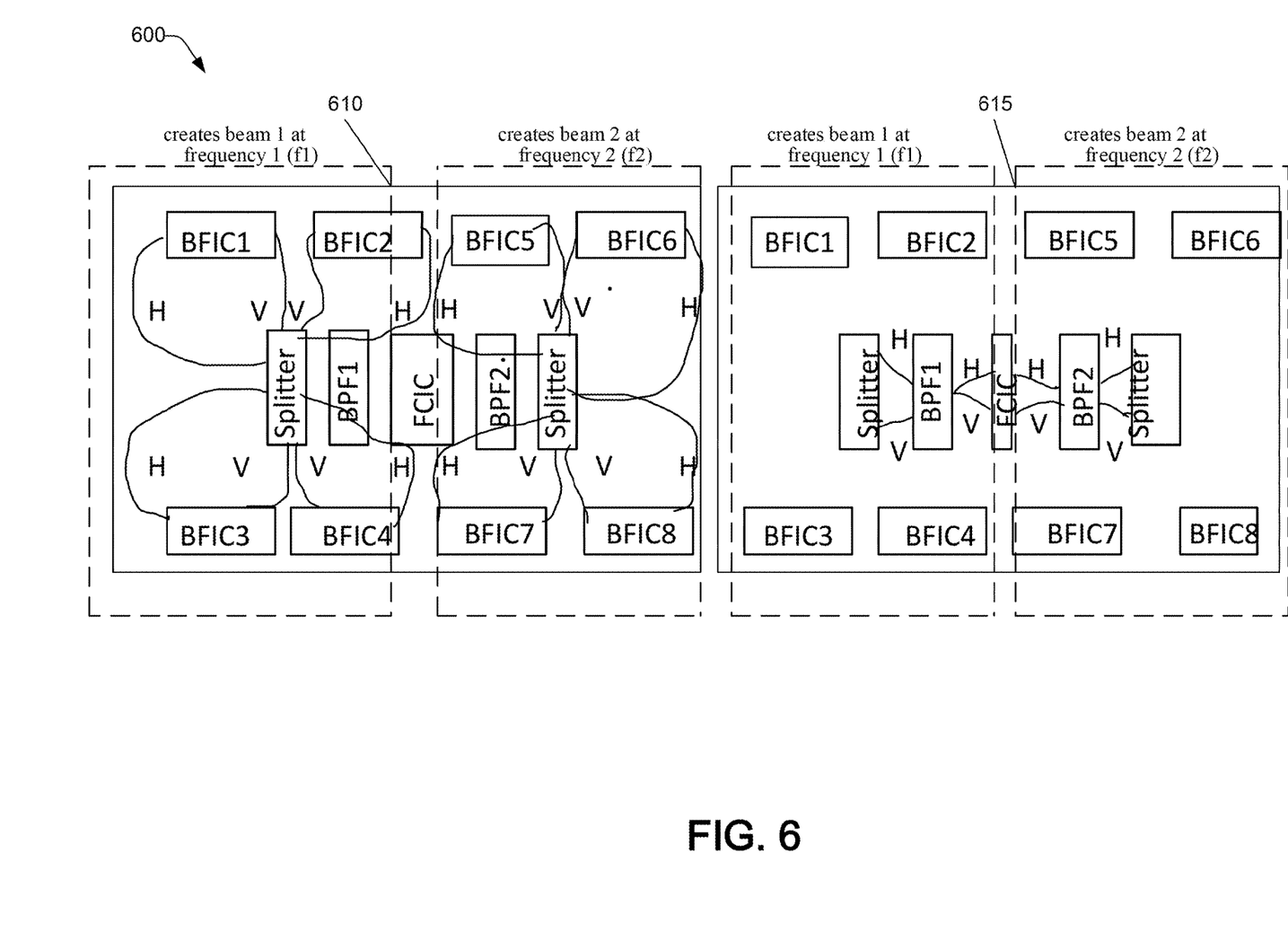
FIG. 6 illustrates a single substrate embodiment with chip-to-chip RF connections consistent with an illustrative embodiment.

FIG. 6 illustrates a single substrate embodiment 600 with chip-to-chip RF connections, consistent with an illustrative embodiment. The substrates 610 and 615 show various connections between BFIC and components such as the splitter, BPF1, frequency up conversion and power combining integrated circuit (FCIC). The V and H pols are arranged differently on each of the substrates 610, 615. This symmetrical placement of components enables using the left half of the phased array 600 to form a beam (beam 1) at a first frequency (f1) in a first direction and the right half of the phased array 600 to form a beam (beam 2) at a second frequency (f2) in a second direction. Note this placement physically separates the RF connections corresponding to each beam, thus improving their isolation.

Figure 7:
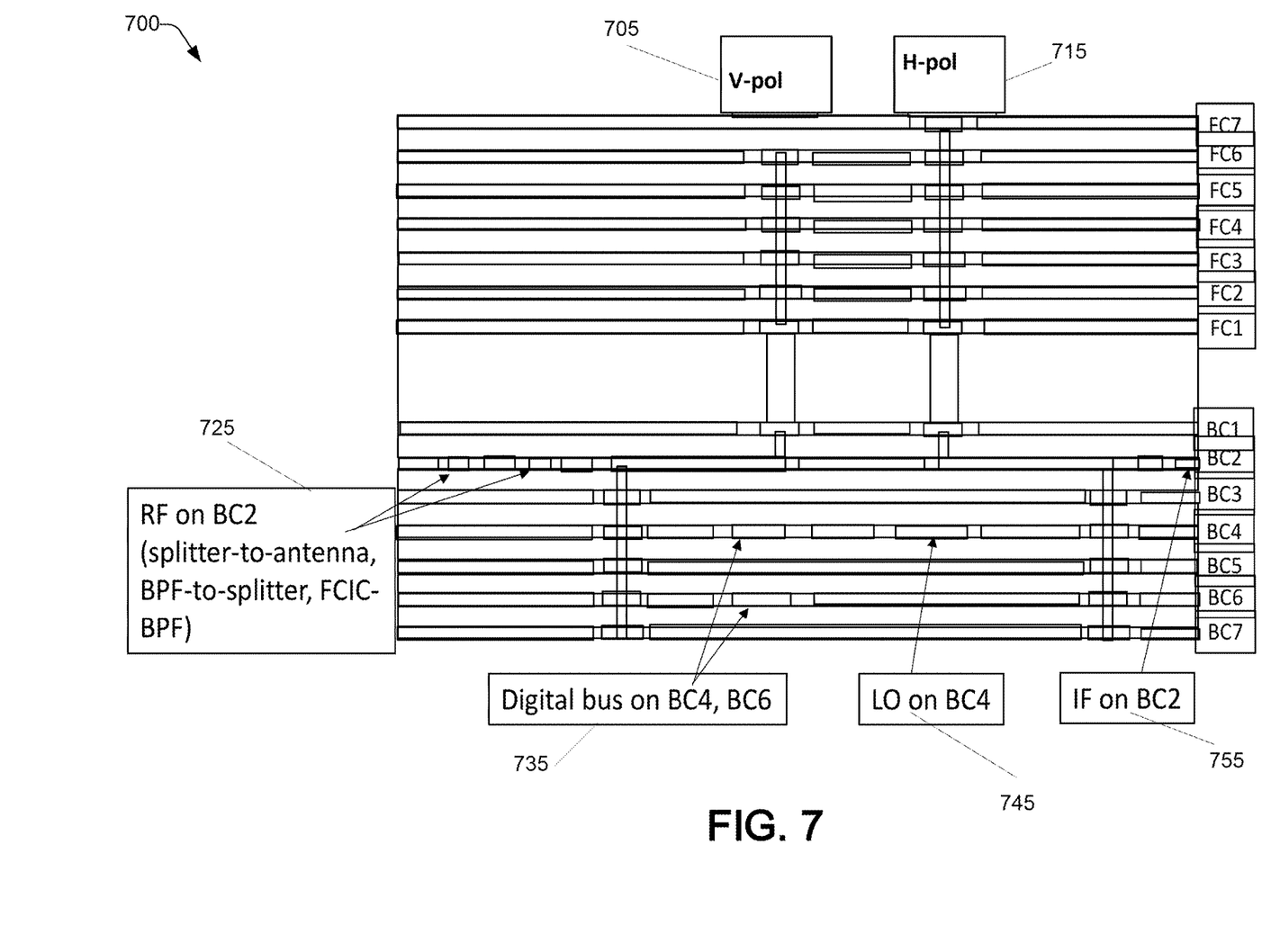
FIG. 7 illustrates a single substrate embodiment showing substrate cross-section construction, consistent with an illustrative embodiment.

FIG. 7 illustrates a single substrate embodiment 700 showing a substrate cross-section construction, consistent with an illustrative embodiment. In this embodiment, the substrate cross section includes a V-pol portion 705 and an H-pol portion 715. On the BC lines, the RF signals 725, digital buses 735 on BC4 BC6, LO on BC4 745, and an IF on BC2.

Example Process

Figure 8:
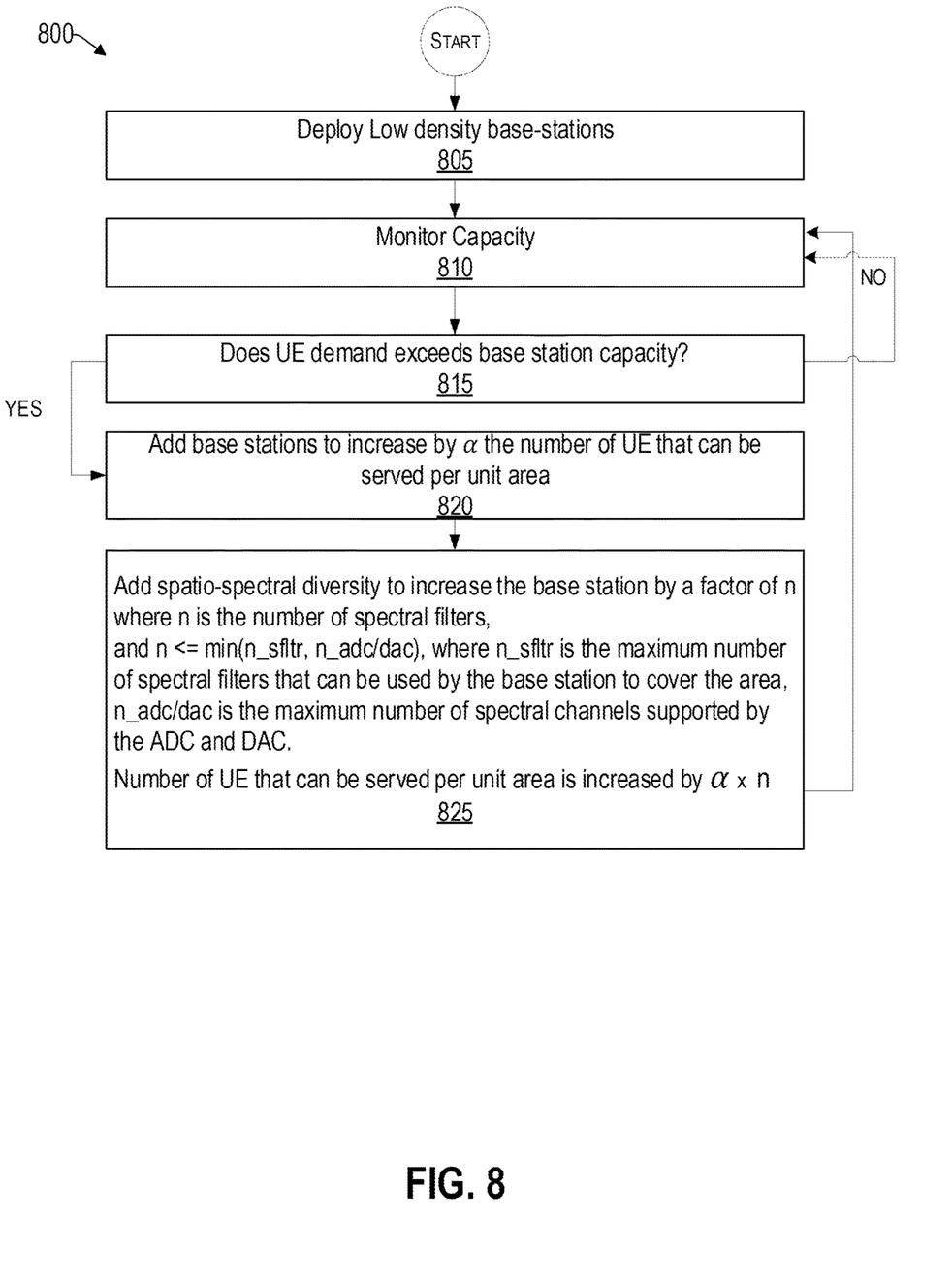
FIG. 8 is a flowchart of a method to increase base station capacity, consistent with an illustrative embodiment.

With the foregoing overview of the example architecture, it may be helpful now to consider a high-level discussion of an example process. To that end, FIG. 8 is a flowchart 800 of a method to increase base station capacity, consistent with an illustrative embodiment. FIG. 8 is shown as a collection of blocks, in a logical order, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

At operation 805, low density base-stations are deployed. Initially, the base stations will use BPFs either BW1, or BW2, (such as shown in FIG. 1), or BWN allowing use of all the elements of the beam former to generate a single beam and generate maximum Effective Isotropic Radiated Power (EIRP), and distance. The arrangement also prevents interferences between adjacent base stations. It is to be noted that with regard to the base station RF board or package, all the filters for each sub-beam former are the same. Alternatively, the sub-beam former is split by using different BPF1, BPF2 filters.

At operation 810, the base station capacity is monitored to ensure that it does not exceed a threshold value. At operation 815, if the User Equipment (UE) exceeds the base station capacity, then at operation 820 base stations are added to increase by α the number of UE that be served per unit area. One way this increase can be realized is discussed with reference to operation 825.

At operation 825, spatio-spectral division multiplexing is added to increase the base station capacity by a factor of n, where n is the number of spectral filters, and n<=min(n_sfltr, n_adc/dac), where n_sfltr is the maximum number of spectral filters that can be used by the base station to cover the area, n_adc/dac is the maximum number of spectral channels supported by the ADC and DAC. Thus, the number of UE that can be served per unit area is increased by α×n.

Spatio-spectral division multiplexing is enabled by splitting the BPFs for example by 2 by using BPF1 and BPF2 and selecting 2 sub-arrays supporting BW1 and BW2 respectively (disclosure slide 4). If for example one base station RF board or package used at the start BPF1 for both filters, one of the 2 filters can be replaced by BPF2. Of course, any combination could be used, as long as BPFX and BPFY cover 2 different bandwidth BWX and BWY respectively, and that there is no frequency interference between adjacent cells. The base station upgrade could be done at the warehouse, in the field, or electronically as well as remotely, if programmable switches are used, to enable the selection of filters within a filter bank. Note that the procedure could be re-iterated several times by splitting by 2 or other numbers, the phased-array in multiple sub-arrays as long as it is supported by the phased-array architecture/hardware.

At operation 830, it is again determined whether UE demand exceeds base station capacity and the process returns to operation 820 if the UE demand does exceed the base station capacity. Otherwise, the method may end, or pause for a period and restart. With regard to digital, the ADC/DAC might also need to be upgraded to cover larger bandwidth. Usually the ADC/DAC are selected up-front to cover larger bandwidth thus supporting a base station upgrade by simply updating the DSP code.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

The components, operations, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

The flowchart, and diagrams in the figures herein illustrate the architecture, functionality, and operation of possible implementations according to various embodiments of the present disclosure.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any such actual relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A phased array antenna comprising:
    an antenna array substrate including a plurality of antenna elements;
    at least two beamformers coupled to the plurality of antenna elements;
    at least two filters supporting different frequency bands and respectively coupled to the at least two beamformers, wherein each filter of the at least two filters, is selectable to output a specific frequency band to one of the at least two beamformers; and
    a frequency converter coupled to the at least two filters, the frequency converter comprising one intermediate frequency (IF) port and at least two radio frequency (RF) ports, wherein:
    the one IF port of the frequency converter is configured to support the at least two beamformers via the at least two RF ports; and
    a first beamformer of the at least two beamformers is coupled to a first filter of the at least two filters to form a first beam in a direction different than a second beamformer of the at least two beamformers coupled to a second filter of the at least two filters.

2. The phased array antenna of claim 1, wherein the at least two beamformers are configured to create different beams in different directions at the same or different polarizations, and different carrier frequencies with different data to support multiple users.

3. The phased array antenna of claim 1, further comprising at least two power splitters, wherein each power splitter is coupled to one of the at least two filters and to two of the at least two beamformers.

4. The phased array antenna of claim 3, wherein the at least two power splitters and the at least two filters are bidirectional.

5. The phased array antenna of claim 3, wherein the at least two filters are dynamically tuned.

6. The phased array antenna of claim 3, wherein the IF port of the frequency converter is configured to input/output an IF signal from/to a same digital baseband module including a digital to analog converter (DAC) and an analog to digital converter (ADC).

7. The phased array antenna of claim 6, wherein:
the frequency converter includes a second IF port; and
each IF port is configured to support at least two RF ports of a respective antenna array group.

8. The phased array antenna of claim 7, wherein the two antenna array groups are configured for dual-polarized transmission and reception.

9. The phased array antenna of claim 1, wherein:
in a dual-polarization arrangement, includes two antenna array groups, each comprising the at least two filters and the at least two beamformers coupled to a single antenna array substrate; and
the frequency converter is coupled to the at least two filters of the two antenna array groups.

10. The phased array antenna of claim 9, wherein one group of the two antenna array groups is configured to transmit or receive different data using a same frequency as the other group of the two array antenna groups.

11. The phased array antenna of claim 9, wherein the two array antenna groups are formed in a multi-tile phased array antenna package as a pluggable module.

12. A phased array antenna comprising:
an antenna array substrate including a plurality of antenna elements;
at least two beamformers coupled to the plurality of antenna elements;
at least two filters supporting different frequency bands and respectively coupled to the at least two beamformers; and
a frequency converter coupled to the at least two filters, the frequency converter comprising one intermediate frequency (IF) port and at least two radio frequency (RF) ports, wherein;
the one IF port of the frequency converter is configured to support the at least two beamformers via the at least two RF ports;
a first beamformer of the at least two beamformers is coupled to a first filter of the at least two filters to form a first beam in a direction different than a second beamformer of the at least two beamformers coupled to a second filter of the at least two filters; and
the at least two beamformers, the at least two filters, and the frequency converter are configured to support two different antenna polarizations.

* * * * *